(No Model.)
H. LEMP & E. THOMSON.
METHOD OF MAKING COLLARS ON AXLES BY ELECTRICITY.
No. 418,198. Patented Dec. 31, 1889.
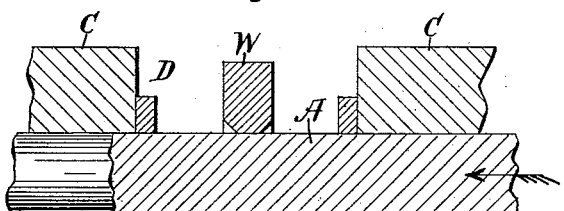
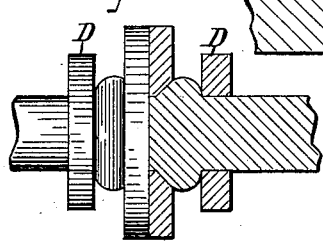
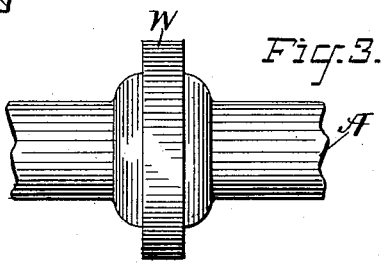
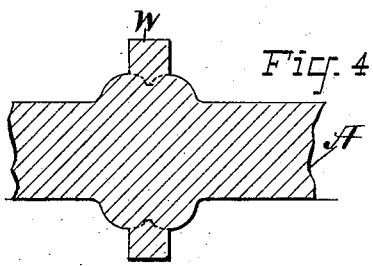
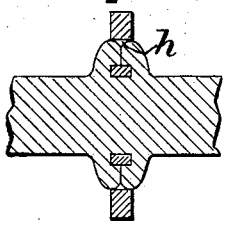 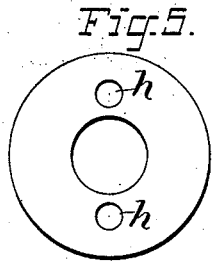 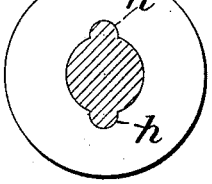
ATTEST:
INVENTORS:
Herman Lemp
Elihu Thomson
By H. L. Townsend
Attorney

UNITED STATES PATENT OFFICE.

HERMANN LEMP AND ELIHU THOMSON, OF LYNN, MASSACHUSETTS.

METHOD OF MAKING COLLARS ON AXLES BY ELECTRICITY.

SPECIFICATION forming part of Letters Patent No. 418,198, dated December 31, 1889.

Application filed August 19, 1889. Serial No. 321,333. (No model.)

*To all whom it may concern:*

Be it known that we, HERMANN LEMP and ELIHU THOMSON, citizens of the United States, and residents of Lynn, in the county of Essex and State of Massachusetts, have invented certain new and useful Methods of Making Collars on Axles, &c., of which the following is a specification.

Our invention relates to a method of securing perforated objects of metal or other material to bars, rods, or otherwise-shaped pieces of metal threaded through the perforation. Our invention is especially applicable, however, to the fastening of pieces of metal to metal rods or bars, inasmuch as it affords a means whereby the perforated piece may not only be simply held against slipping off the bar, but may be rigidly welded thereto and fixed against movement in any direction thereon.

Our invention affords a ready method of providing metal stock, as rods or shafts, with collars or flanges, and is especially applicable to making collars upon axles or to securing circular saws, gear-wheels, or other tools or objects to driving-shafts.

Our invention consists, essentially, in passing a current of electricity of large volume through the piece of metal, as a shaft or rod, while the same is threaded through the perforation in the object to be fastened to it until such bar, rod, or other metal piece is softened, and then subjecting it to a suitable force, as compression, which will cause it to bulge or expand laterally to both sides of the perforated object.

Our invention consists, also, in keying a perforated object, as a gear-wheel, circular saw, or other object subjected to tangential or circular strain, on its support, consisting in heating the shaft, rod, or other support threaded through the perforation by a current of electricity circulating in it, and then expanding it laterally by endwise compression, so as to cause the softened metal to enter the key-notches, openings, depressions, or perforations.

Our invention consists, further, in the detailed methods and improvements hereinafter described, and then specified in the claims.

In the accompanying drawings, Figure 1 illustrates the application of our invention to providing a shaft with a collar. Fig. 2 illustrates the condition of the work after compression. Fig. 3 shows the finished work. Fig. 4 is a longitudinal section of Fig. 3. Fig. 5 illustrates one form that may be given to the perforated ring, disk, wheel, or other object for keying it to its shaft or threaded piece of metal. Fig. 6 is a longitudinal section through a piece of finished work in which the perforated piece, Fig. 5, is employed. Fig. 7 is a modification in the form of the key openings or depressions.

Referring to Fig. 1, C C are heavy clamps or holders, of copper or other good conductor, one or both movable endwise, which are supplied with electricity of great volume and low electro-motive force from any source, as described in patent to E. Thomson, No. 396,010, dated January 8, 1889, and as now commonly practiced in electric welding operations.

A is the bar, rod, or piece of metal held in the clamps for the purpose of causing a current of electricity to pass through it, so as to heat and soften it.

W is a perforated ring, washer, or disk through which the rod A is threaded. The perforated piece W is set approximately midway between the clamps, and the hole through it is preferably countersunk at both sides, to allow an accumulation of the material of the piece A to take place in the countersunk portion. When the piece A has been sufficiently heated, end pressure or other force is applied in the direction of the arrow, thus causing the heated metal within and to either side of the perforation to swell or bulge laterally, so as to form an enlargement, which when cool will hold the piece A. If the piece A is heated sufficiently by the current, the piece W, when of metal, may be actually welded to the piece A and the enlargements or expansions thereon.

In order to prevent the expansions or swells from extending back from the perforation farther than is absolutely necessary, collars D may be applied in the positions shown. These collars may, in fact, form a part of the clamps. They are kept cool by contact with the large mass of the clamps or by forming a part of the body of the clamps.

In this method of providing a shaft or rod with a metal collar the tensile strength of the part A cannot be impaired—a fact that has been abundantly proved in practice.

By applying this method to the manufacture of axles a considerable amount of work heretofore used is done away with.

Axles have hitherto been forged out of stock the size of the collar down to the size of straight or reduced portion; but by our method plain steel or iron bars of the required thickness of shaft may be used instead, and the collar prepared beforehand and fastened in a few seconds' time to the same. The method described is effectual where the piece W is to be held from longitudinal movement; but where W is liable to strain which will tend to turn it on A, and the latter is round at the point where it threads W, we provide the perforated piece W with recesses, depressions, or notches $h$ $h$, Figs. 5, 6, and 7, into which the swelled or expanded soft metal of A will enter, so as to key the part W to A. These notches, recesses, or openings may be entirely outside the central perforation in W, as in Fig. 5, and may extend through W from side to side, or partially through it, as desired; or they may be notches extending outward from the central perforation, as in Fig. 7, or be formed in any desired way, so as to form a lock or key by the aid of the softened upset metal of A, and to hold W against turning on A. It is obvious that after the lateral bulge or expansion has been formed the bulge may be finished by hammering or pressure, for the purpose of compacting the bulge, or for forcing the heated metal of the bulge into the key recesses or openings in W. It is obvious, also, that the bulge or expansion may be dressed off by any desired tools.

What we claim as our invention is—

1. The herein-described method of securing rings, washers, collars, or other perforated objects to metal bars, rods, or other pieces of metal, consisting in passing a current of electricity through the metal piece in volume sufficient to soften the same, and then subjecting the piece to endwise pressure, so as to swell or expand it at both sides of the perforation.

2. The herein-described method of fastening a perforated piece of metal to another metallic piece passing through the perforation, consisting in including said metallic piece in an electric circuit, passing an electric current through the same in amount sufficient to soften it, and then subjecting such piece to compression, so as to cause it to expand laterally at either side of the perforated piece.

3. The herein-described method of securing a perforated piece of metal to another piece threaded through the perforation, consisting in causing a heating current of electricity to pass through the threaded piece until the same is heated to a welding temperature and causing it to swell or expand laterally at either side of the perforated piece, as and for the purpose described.

4. The herein-described method of keying a perforated object to a piece of metal threaded through the perforation, consisting in providing the perforated object with recesses, openings, or depressions to one side of the perforation, subjecting the threaded piece to a heating and softening current of electricity, and then applying force in a direction to cause it to swell or expand laterally at the sides of the perforated piece and to enter the said recesses or depressions.

5. The herein-described method of keying a perforted piece of metal to a bar or rod, consisting in softening the bar or rod by an electric current passed through it and then subjecting the bar to pressure, so as to cause the softened metal to expand and enter key openings or recesses in the perforated piece.

6. The herein-described method of limiting the longitudinal extent of the expansion to either side of the perforated piece, consisting in applying collars to the piece subjected to electric heating and pressure at points thereon removed a determinate distance from the perforated piece.

7. The herein-described method of fastening a perforated piece of metal to another piece threaded through it, consisting in providing one or more notches at the edge of the perforation, passing a softening-current of electricity through the threaded piece, and then subjecting said piece to a force which will cause the same to expand laterally into the notch and to either side of the perforated piece.

Signed at Lynn, in the county of Essex and State of Massachusetts, this 15th day of August, A. D. 1889.

HERMANN LEMP.
ELIHU THOMSON.

Witnesses:
JOHN W. GIBBONEY,
A. L. ROHRER.